(12) United States Patent
Izumi

(10) Patent No.: US 7,925,849 B2
(45) Date of Patent: Apr. 12, 2011

(54) REQUEST ARBITRATION DEVICE AND MEMORY CONTROLLER

(75) Inventor: Yuji Izumi, Tokyo (JP)

(73) Assignee: Renesas Electronics Corporation, Kanagawa (JP)

(*) Notice: Subject to any disclaimer, the term of this patent is extended or adjusted under 35 U.S.C. 154(b) by 489 days.

(21) Appl. No.: 12/153,307

(22) Filed: May 16, 2008

(65) Prior Publication Data

US 2008/0288731 A1 Nov. 20, 2008

(30) Foreign Application Priority Data

May 18, 2007 (JP) .................................. 2007-132245

(51) Int. Cl.
*G06F 12/00* (2006.01)
(52) U.S. Cl. ........ 711/160; 711/133; 711/136; 711/151; 711/158; 711/159
(58) Field of Classification Search .......... 711/133–134, 711/136, 151, 158–160
See application file for complete search history.

(56) References Cited

U.S. PATENT DOCUMENTS

2006/0004956 A1* 1/2006 Madajczak ................. 711/108

FOREIGN PATENT DOCUMENTS

JP 2006-099199 4/2006

* cited by examiner

Primary Examiner — Jasmine Song
(74) Attorney, Agent, or Firm — McDermott Will & Emery LLP

(57) ABSTRACT

A bus arbiter receives requests of initiators, and internally includes a page hit/miss determining unit with permissible determining function, a bank open/close determining unit with permissible determining function, and an LRU unit with permissible determining function. Regarding the priority of the request arbitration on the requests, the bank priority on the SDRAM is determined in the order of page hit, bank open, and LRU. Furthermore, each determining unit internally includes a permissible time determining unit, and processes, at top priority, the request of the initiator which the corresponding permissible time is below the count threshold value in the priority processing of the determining unit.

12 Claims, 13 Drawing Sheets

REQUEST ARBITRATION DEVICE AND MEMORY CONTROLLER

BACKGROUND OF THE INVENTION

1. Field of the Invention

The present invention relates to a request arbitration device such as a bus arbiter for arbitrating requests of access etc. to a predetermined memory from a plurality of initiators, and a memory controller.

2. Description of the Background Art

FIG. 15 is a block diagram showing a system configuration of a bus arbiter of the prior art and peripheral parts thereof. As shown in the figure, a bus arbiter 64 is arranged between a CPU 60 and initiators 61 to 63, and a SDRAM memory controller 65.

The bus arbiter 64 arbitrates requests from the CPU 60 and the initiators 61 to 63, and issues a request to the SDRAM memory controller 65. Each initiator 61 to 63 requires an image system (3D, 3D) and image compression, and transfer of great amount of data such as voice, and the like. The bus arbiter 64 thus needs to perform arbitration to satisfy the request from each initiator 61 to 63.

A request on different addresses in an SDRAM (Synchronous Dynamic Random Access Memory) 66 is issued from each initiator 61 to 63 to the bus arbiter 64. It becomes necessary to enhance a command issuing efficiency on the SDRAM 66 by performing arbitration in the bus arbiter 64 such that penalty due to page miss, bank miss, and interruption by another initiator in time of access of the SDRAM 64 reduces. The penalty includes bank miss penalty, page miss penalty, and the like.

In order to enhance the command issue efficiency on the SDRAM 66, arbitration taking bank hit/miss of the SDRAM 66, preceding PRE, ACT command issue to the SDRAM 66, and the like into consideration is performed in the bus arbiter 64.

An arbitration technique of memory access request with enhanced command issue efficiency on the SDRAM 66 includes a technique disclosed in Unexamined Japanese Patent Application Laid-Open No. 2006-99199 and the like. In Unexamined Japanese Patent Application Laid-Open No. 2006-99199, an arbitration technique of preferentially giving access permission to a memory master requesting an access to the same page as the last access page is disclosed.

FIG. 16 is a block diagram showing the SDRAM memory controller 65 and the peripherals thereof. An access efficiency enhancing method of an eight-bank SDRAM is generally adopted in the SDRAM memory controller 65.

The SDRAM memory controller 65 issues a command to the SDRAM 66 in response to a request from the bus arbiter 64.

In the SDRAM including DDR2 (Double-Dta-Rate2)-SDRAM and the like, the SDRAM of four, eight bank articles exists. When using eight bank articles, the eight-bank article control method opens up to four banks in the SDRAM memory controller, and the bank to be closed when opening the fifth bank is a determined bank that forms a pair.

A waiting time during which the processing data of each initiator does not break needs to be taken into consideration in the bus arbiter. The waiting time during which the initiator does not break is referred to as "permissible time". The data breakage of the initiator refers to disturbance of image in the initiator of graphics system, interruption of voice in the initiator of voice system, and the like.

However, in the conventional bus arbiter or the technique of arbitrating the memory access request disclosed in Unexamined Japanese Patent Application Laid-Open No. 2006-99199, request arbitration that takes the permissible time into consideration is not performed.

In addition to not taking the permissible time into consideration, in the eight bank article control method, the bank that is likely to be accessed might get closed since the bank to be closed when opening the fifth bank is the determined bank that forms a pair. The SDRAM access performance thus might lower.

SUMMARY OF THE INVENTION

The present invention aims to provide a request arbitration device which takes into consideration a permissible time which is waiting time in which the initiator does not break and which performs an efficient request arbitration, and a memory controller in which performance of a memory to be controlled is enhanced.

According to the request arbitration device of the present invention, the page hit/miss determining unit with permissible time determining function includes a page hit/miss determining part and a permissible time determining part operating in conjunction to each other.

The page hit/miss determining part compares an access address to the SDRAM of the respective plurality of requests and a previous access address, determines presence of page hit in which a bank and a page specified by the respective addresses match for the plurality of requests, and preferentially determines the priority request from the page hit requests out of the plurality of requests.

When a memory access requiring initiator which is an initiator which remaining time of the permissible time set in correspondence to the initiator reached lower than or equal to a predetermined time exists, the permissible time determining part determines the request of the memory access requiring initiator out of the plurality of requests as the priority request in preference to the determination of the page hit/miss determining part.

According to the present invention, the request arbitration that preferentially takes into consideration the permissible time of each initiator by the permissible time determining part can be performed while enhancing the issuing efficiency of the request on the SDRAM by prioritizing the page hit request through cooperation of the page hit determining part and the permissible time determining part.

These and other objects, features, aspects and advantages of the present invention will become more apparent from the following detailed description of the present invention when taken in conjunction with the accompanying drawings.

DESCRIPTION OF THE PREFERRED EMBODIMENTS

<Basic Technique>
(Bus Arbitration Method)

Figure 12:
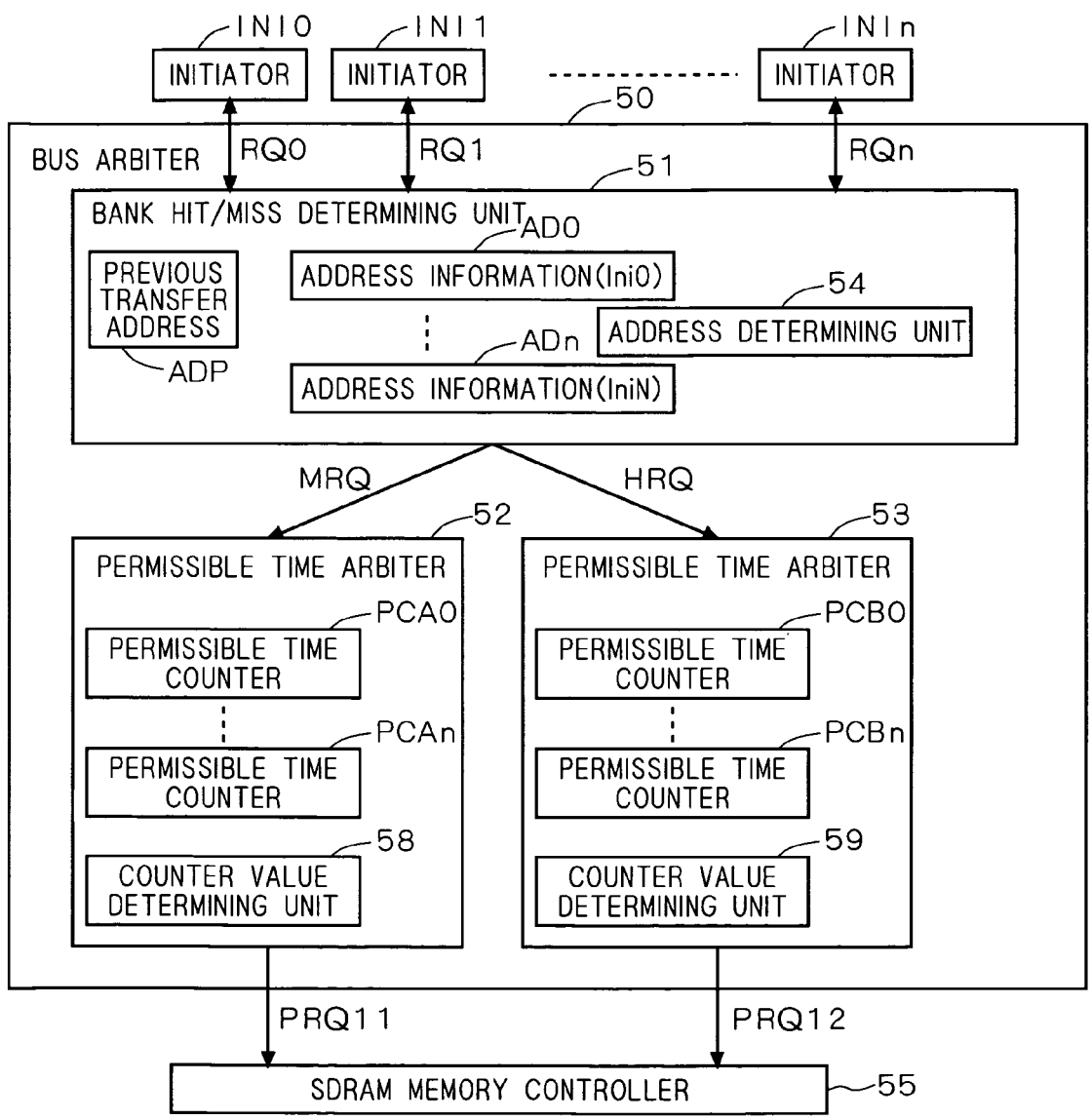
FIG. 12 is a block diagram showing a bus arbitration method that serves as a basic technique of the present invention.

FIG. 12 is a block diagram showing a bus arbitration method that serves as a basic technique of the present invention. As shown in the figure, a bus arbiter 50 arbitrates requests RQ0 to RQn on the SDRAM from (n+1) (n≧1) initiators INI0 to INIn. When referring to one of the requests RQ0 to RQn, it is sometimes simply referred to as request RQ below.

First, the requests RQ0 to RQn are arbitrated in a bank hit/miss determining unit 51. The bank hit/miss determining unit 51 holds a previous transfer address ADp of a request sent to a SDRAM memory control 55 the previous time, and current address information AD0 to ADn of the initiators INI0 to INIn.

The bank hit/miss determining unit 51 compares the previous transfer address ADp and the address information AD0 to ADn, recognizes a request specifying an address of a bank address (bank miss) different from the request sent the previous time, prioritizes the request of the bank address (bank) different from the previous transfer address ADp out of the requests RQ0 to RQn, and sets the same as the processing target of a permissible time arbiter 52. The priority of the request of the bank address (bank) same as the previous transfer address ADp is lowered, on the other hand, and set as the processing target of a permissible time arbiter 53.

The request determined as bank miss by the bank hit/miss determining unit 51 out of the requests RQ0 to RQn is assumed as a bank miss request MRQ. The request determined as bank hit by the bank hit/miss determining unit 51 out of the requests RQ0 to RQn is assumed as a bank hit request HRQ.

In the permissible time arbiters 52, 53, the permissible time which is the waiting time during which the processing data of each initiator INI0 to INIn does not break is set in a register (not shown). Specifically, a time in which the number of cycles from when each initiator issues a request until the initiator receives a response can be satisfied is the permissible time.

This permissible time is set in the register, so that arbitration can be changed for every system, and allocation of the usable time for every initiator can be finely set. That is, in the permissible time arbiters 52, 53, arbitration is performed with the permissible time of each initiator INI0 to INIn set.

The permissible time arbiters 52, 53 includes permissible time counters PCA0 to PCAn and permissible time counters PCB0 to PCBn, respectively, for counting the permissible time for every initiator in order to perform arbitration using the permissible time. The permissible time counters PCA0 to PCAn and the permissible time counters PCB0 to PCBn are arranged in correspondence to the initiators INI0 to INIn. When referring to one of the permissible time counters PCA0 to PCAn and the permissible time counters PCB0 to PCBn, it is sometimes simply referred to as permissible time counter PCA and permissible time counter PCB.

The permissible time counters PCA0 to PCAn and the permissible time counters PCB0 to PCBn respectively down-counts the permissible time count value when the request of the corresponding initiator is not sent to the memory controller 55, and adds the permissible time by the time set in the corresponding register when the request of the corresponding initiator is sent to the memory controller 55.

The arbitration on the initiators INI0 to INIn can be tuned since the value to be set in the register of the permissible time counters PCA0 to PCAn and the permissible time counters PCB0 to PCBn is arbitrary. The level threshold value (count threshold value LVth) of the count value CT is defined, and the request RQ of the initiator which count value CT of the permissible time counter is lower than the count threshold value LVth is given top priority. In this case, regardless of whether the request RQ is the bank miss request MRQ or the bank hit request HRQ, a priority request PRQ10 (priority request PRQ11, PRQ12) is sent to the SDRAM memory controller 55 as an emergency process.

For instance, if at least one bank miss request MRQ exists, the process by the permissible time arbiter 52 is executed. However, if at least one of the count values CT of the permissible time counters PCA0 to PCAn is below the count threshold value LVth, a permissible time lowering request ERQ which is the request RQ of the initiator corresponding to the relevant count value CT is preferentially set as the priority request PRQ10 by a count value determining unit 58. In this case, the permissible time lowering request ERQ is prioritized regardless of whether the bank miss request MRQ or not.

If all the count values CT of the permissible time counters PCA0 to PCAn (permissible time counters PCB0 to PCBn) are greater than the count threshold value LVth, normal arbitration is executed by the permissible time arbiters 52, 53. The normal process of the permissible time arbiters 52, 53 will be described below.

If the bank miss request MRQ which is the target of the permissible time arbiter 52 exists in plurals, the count value determining unit 58 selects the bank miss request MRQ corresponding to the smallest count value CT of the count values CT of the plurality of permissible time counters PCA corresponding to the plurality of bank miss requests MRQ as a priority request PRQ11.

If the bank miss request MRQ which is the target of the permissible time arbiter 52 does not exist, the permissible time arbiter 53 selects the priority request PRQ12 from the bank hit requests HRQ. A count value determining unit 59 in the permissible time arbiter 53 selects a bank hit request HRQ corresponding to the smallest count value CT of the target bank hit requests HRQ as the priority request PRQ12.

If at least one count value CT of the count values CT of the permissible time counters PCB0 to PCBn below the count threshold value LVth exists in time of executing arbitration by the permissible time arbiter 53, the count value determining unit 59 sets the permissible time lowering request ERQ which is the request RQ corresponding to the relevant count value CT as the priority request PRQ12 at top priority.

Figure 13:
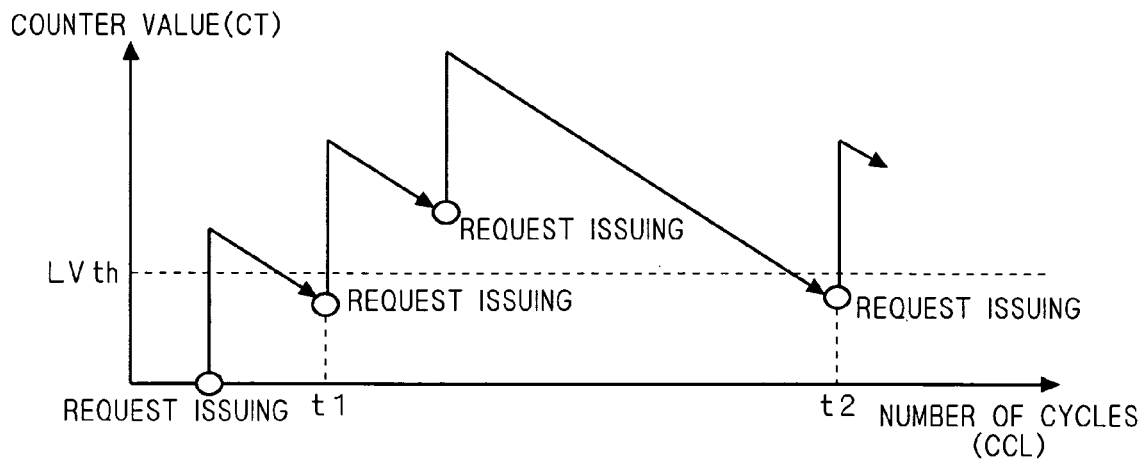
FIG. 13 is an explanatory view showing a count operation example of a permissible time counter.

FIG. 13 is an explanatory view showing a count operation example of the permissible time counter PCA (PCB). As shown in the figure, the count value CT is added by a permissible time set in advance in time of the corresponding request actual issuing. The request actual issuing refers to when the request output from the initiator corresponding to the count value CT is determined as the priority request PRQ11 (PRQ12) by the bus arbiter 50, and actually output to the SDRAM from the SDRAM memory controller 55. In time of request non-issuing, the count value is counted down with elapse of the clock cycle (number of cycles CCL). As shown in FIG. 13, since the count value is below the count threshold value LVth at timing t1 and t2, the corresponding requests are processed at top priority, and the requests are surely issued.

(SDRAM Memory Controller)

Figure 14:
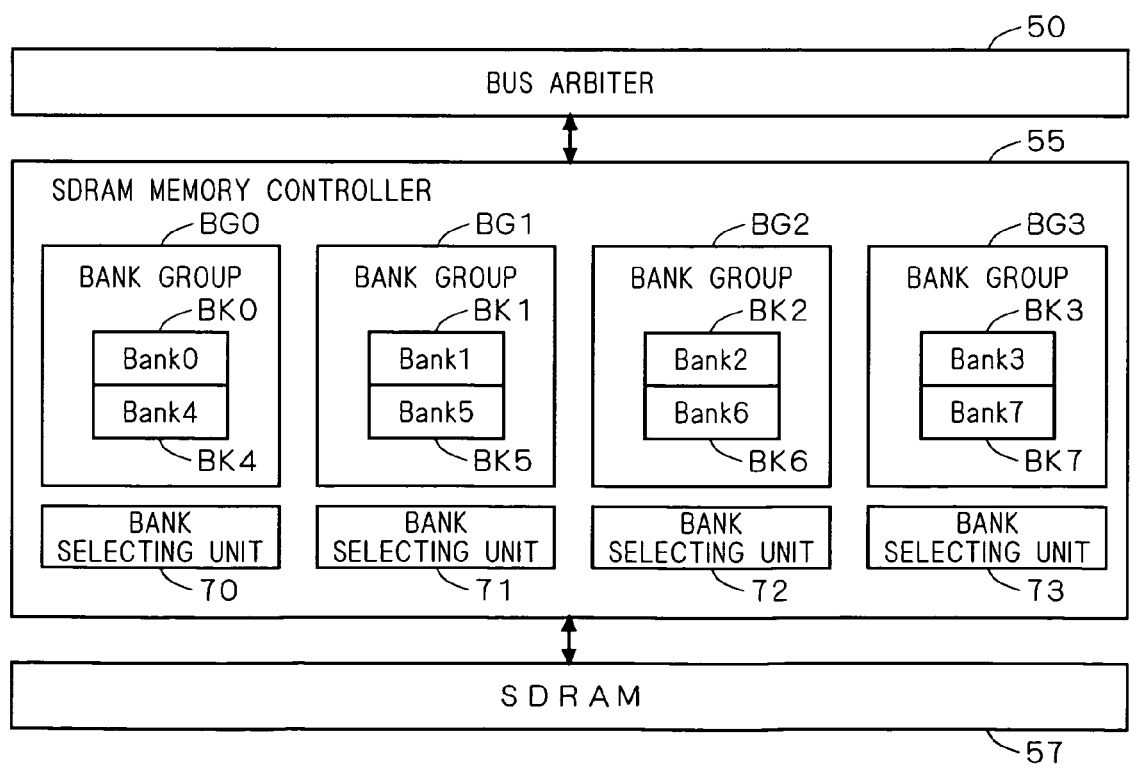
FIG. 14 is an explanatory view showing details of an SDRAM memory controller.
Figure 15:
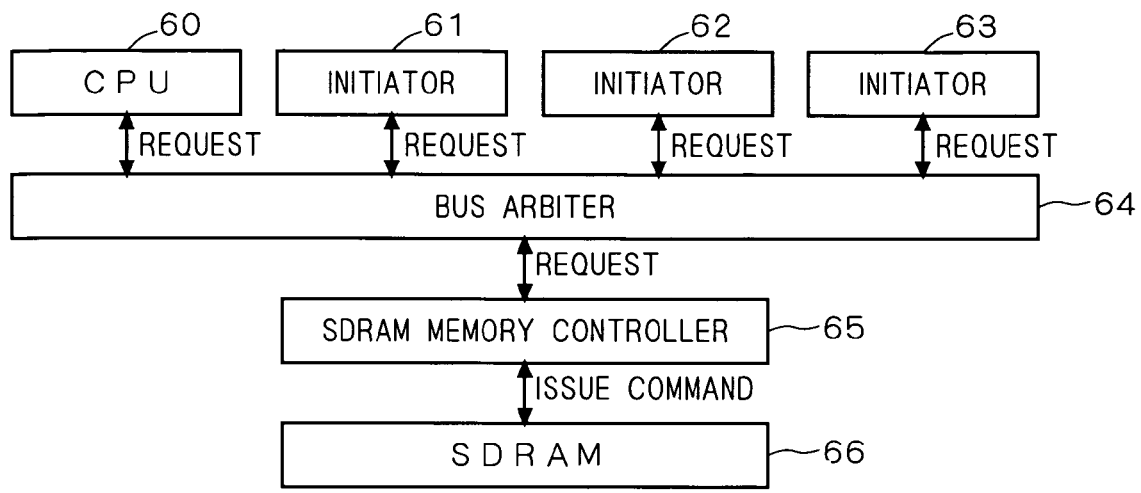
FIG. 15 is a block diagram showing a system configuration of a bus arbiter of the prior art and peripherals parts thereof.
Figure 16:
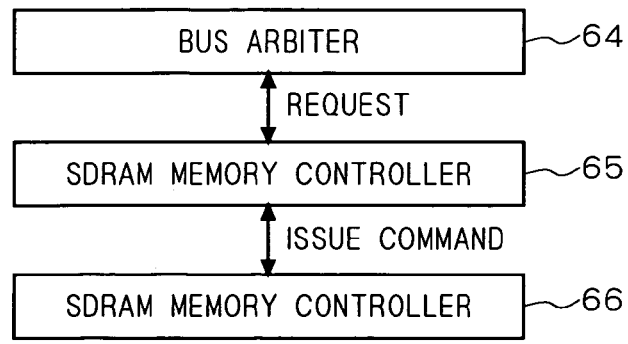
FIG. 16 is a block diagram showing an SDRAM memory controller of the prior art and the peripherals thereof.

FIG. 14 is an explanatory view showing details of the SDRAM memory controller 55. The SDRAM memory controller 55 shows a configuration in which the target SDRAM 57 is eight-bank articles (bank BK0 to BK7).

As shown in the figure, the SDRAM memory controller 55 performs open/close control of the eight banks in the SDRAM 57 with four bank groups BG0 to BG3. That is, the bank group BG0 includes a bank BK0 and a bank BK4 as a pair, and opens one bank and closes the other bank by means of a bank selecting unit 70. Similarly, the bank group BG1 includes a bank BK1 and a bank BK5 as a pair, and opens one bank and closes the other bank by means of a bank selecting unit 71. The bank group BG2 includes a bank BK2 and a bank BK6 as a pair, and opens one bank and closes the other bank by means of a bank selecting unit 72. The bank group BG3 includes a bank BK3 and a bank BK7 as a pair, and opens one bank and closes the other bank by means of a bank selecting unit 73.

Thus, the SDRAM memory controller 55 that serves as the basic technique has a specification of bank opening only one bank in the respective bank groups BG0 to BG3 having a combination of banks defined in the bank groups BG0 to BG3 as a pair. Therefore, when a bank access request of the fifth bank is made by the bus arbiter 50, the other bank forming a pair with the bank to be opened as the fifth bank of the bank groups BG0 to BG3 is forcibly closed.

(Problems of the Basic Technique)

In the bus arbitration method in the basic technique shown in FIGS. 12 and 13, the bank missed request is preferentially transmitted to the memory controller in the normal process. The arbitration related to the address is only hit/miss determination of the bank address.

However, in cases of bank miss and page miss, the SDRAM 57 cannot exhibit sufficient performance since signal PRE, ACT is always issued in time of access to the SDRAM 57.

In the bank switching method of the SDRAM memory controller shown in FIG. 14, the bank address to be closed when opening the fifth bank of the eight bank articles is not closed depending on the performance. Thus, the signal PRE, ACT needs to be issued when the bank is closed even if the signal PRE, ACT does not need to be issued since the bank essentially hits, and thus the command issuing efficiency to the SDRAM lowers.

The bus arbiter which is a request arbitration device of the subject invention for resolving the above problems enhances transfer efficiency by optimizing the command issuing order of the SDRAM and takes the permissible time into consideration. The memory controller of the subject invention also enhances the performance of the SDRAM.

First Embodiment

Figure 1:
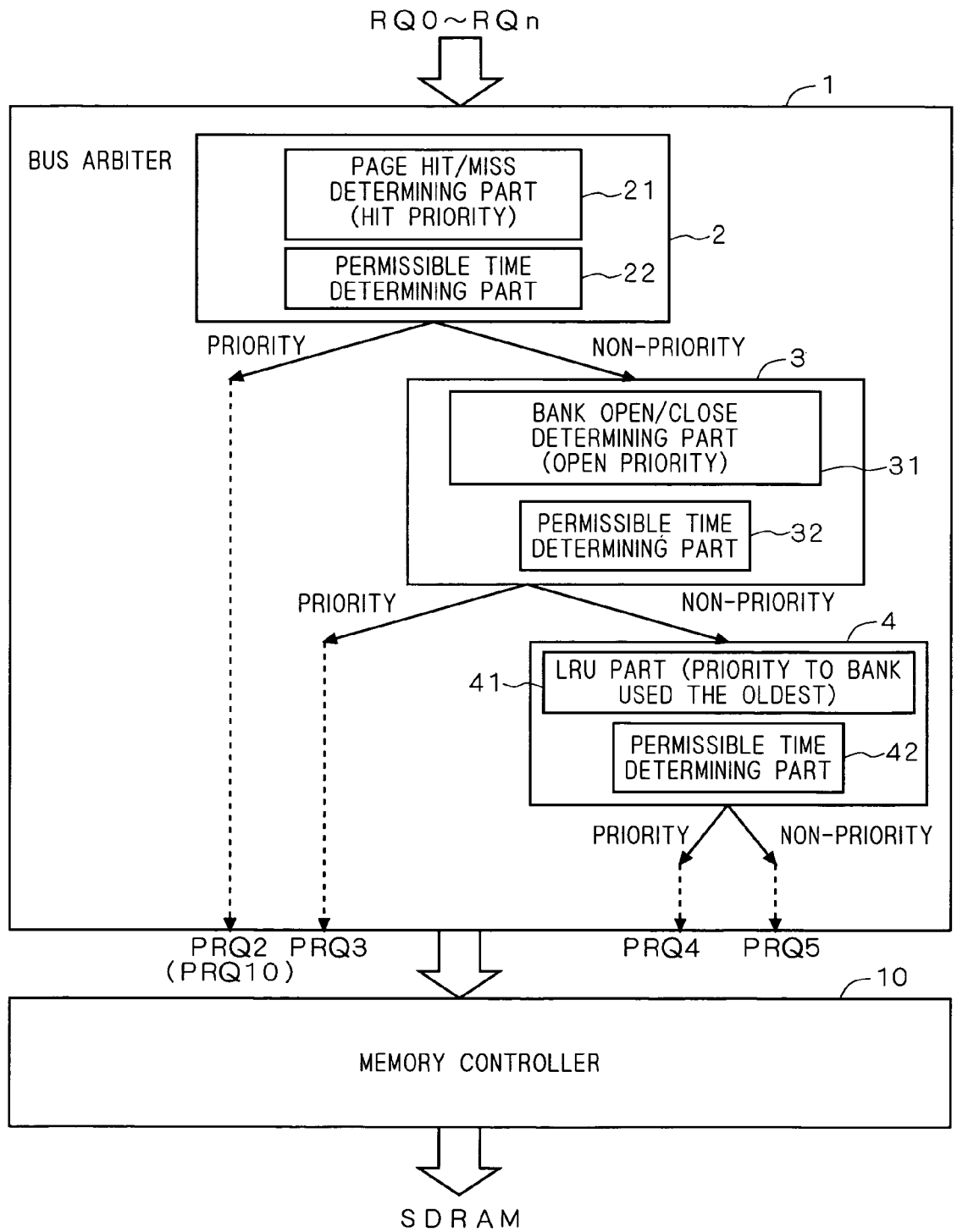
FIG. 1 is a block diagram showing a configuration of a bus arbiter according to a first embodiment of the present invention.

FIG. 1 is a block diagram showing a configuration of a bus arbiter which is a request arbitration device according to a first embodiment of the present invention. As shown in the figure, the bus arbiter 1 of the first embodiment receives requests RQ0 to RQn of the initiators INI0 to INIn (not shown). The bus arbiter 1 internally includes a page hit/miss determining unit 2 with permissible time determining function, a bank open/close determining unit 3 with permissible time determining function, and an LRU unit 4 with permissible time determining function.

As shown in the figure, regarding the priority of request arbitration, the bank priority on the SDRAM is determined in the order of page hit, bank open, LRU (Least Recently Used (bank used the least recent)). Furthermore, each determining unit 2 to 4 internally includes a permissible time determining part 22, 32, 42, and processes at top priority the request RQ of the initiator which permissible time is below the count threshold value LVth in the priority processing of the determining units 2 to 4, as hereinafter described in detail.

The bus arbiter 1 of the first embodiment has the SDRAM which is a predetermined memory to be accessed assigned with a plurality of banks, which plurality of banks are respectively assumed to be assigned with a plurality of pages (normally assigned by row address).

Figure 2:
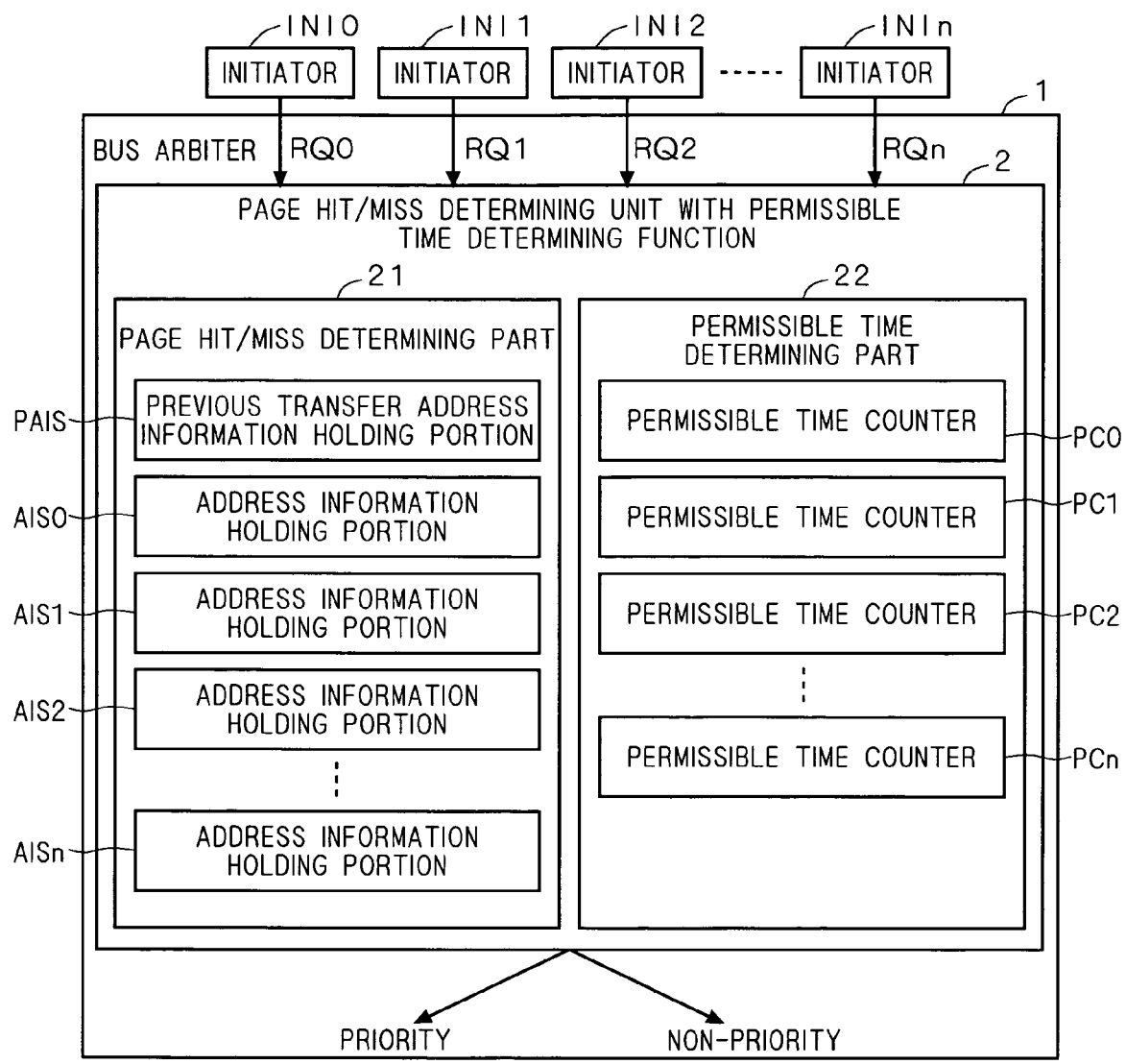
FIG. 2 is a block diagram showing an internal configuration of a page hit/miss determining unit with permissible time determining function in the bus arbiter shown in FIG. 1.

FIG. 2 is a block diagram showing an internal configuration of the page hit/miss determining unit 2 with permissible time determining function in the bus arbiter 1. As shown in the figure, the page hit/miss determining unit 2 with permissible time determining function includes a page hit/miss determining part 21 and a permissible time determining part 22.

The page hit/miss determining part 21 includes a previous transfer address information holding portion PAIS and address information holding portions AIS0 to AISn. The previous transfer address information holding portion PAIS holds a previous transfer address ADp (previous access address) in the priority request PRQ provided to the memory controller 10 immediately before. The address information holding portions AIS0 to AISn hold the access address to the SDRAM in the requests RQ0 to RQn currently issued from the initiators INI0 to INIn as address information AD0 to ADn.

Figure 3:
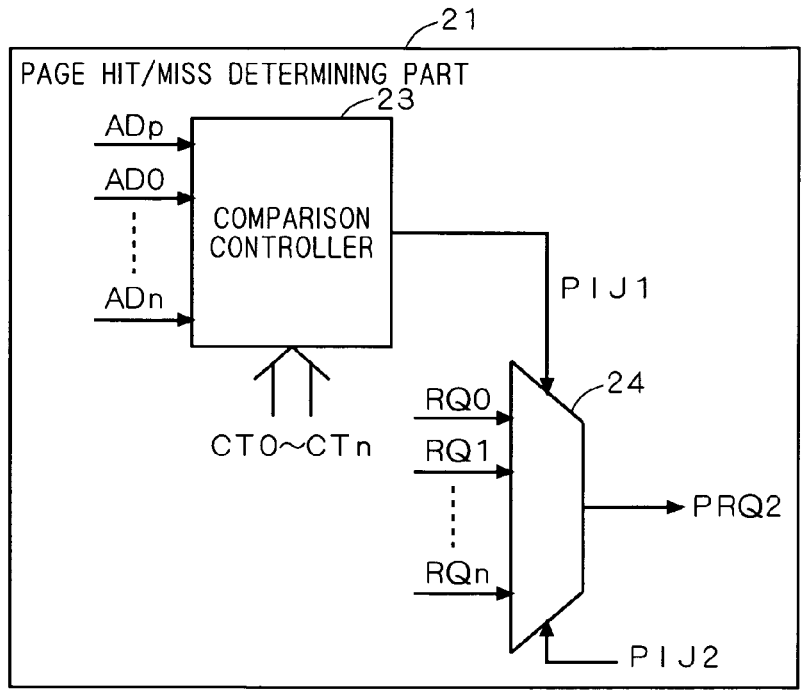
FIG. 3 is an explanatory view showing an internal configuration of a page hit/miss determining part shown in FIG. 2.

FIG. 3 is an explanatory view showing an internal configuration of the page hit/miss determining part 21. The configuration combining FIGS. 2 and 3 is the internal configuration of the page hit/miss determining part 21.

A comparison circuit 23 receives the previous transfer address ADp obtained from the previous transfer address information holding portion PAIS, the address information AD0 to ADn obtained from the address information holding portions AIS0 to AISn, and the count values CT0 to CTn obtained from the permissible time counters PC0 to PCn of the permissible time determining part 22. The comparison circuit 23 compares the bank address and the page address of the previous transfer address ADp and the address information AD0 to ADn, and determines the presence of page hit of the respective address information AD0 to ADn. As a result, the comparison circuit 23 recognizes the page hit address HAD which is the address of page hit of the address information AD0 to ADn.

If the page hit address HAD exists in plurals, the comparison circuit 23 compares the count values CT corresponding to the respective page hit addresses HAD from the count values CT0 to CTn, and sets the page hit address HAD having the smallest count value CT as a priority page hit address PHAD. The comparison circuit 23 outputs priority initiator information PIJ1 instructing an initiator that has issued a request RQ with the priority page hit address PHAD out of the initiators INI0 to INIn as the priority initiator.

If the priority initiator information PIJ2 to be hereinafter described instructs no memory access requiring initiator, a selector 24 selects the request RQ corresponding to the initiator instructed by the priority initiator information PIJ1 of the requests RQ0 to RQn as a priority request PRQ2.

Figure 4:
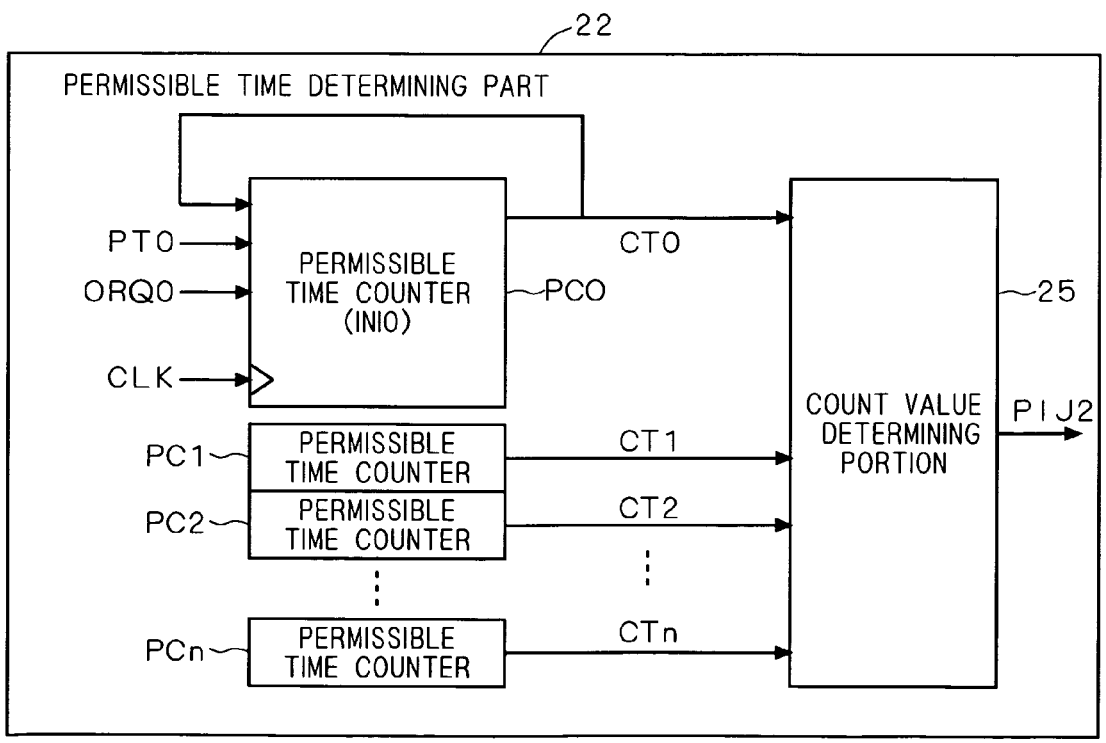
FIG. 4 is a block diagram showing details of an internal configuration of the permissible time determining part shown in FIG. 2.

FIG. 4 is a block diagram showing details of the internal configuration of the permissible time determining part 22. As shown in the figure, the permissible time determining part 22 is configured by permissible time counters PC0 to PCn and a count value determining portion 25. The permissible time counters PC0 to PCn are arranged in correspondence to the initiators INI0 to INIn.

The permissible time counter PC0 receives request actual issuing information ORQ0, permissible time information PRO, and a clock CLK, and outputs a count value CT0. The request actual issuing information ORQ0 is information that becomes active when the corresponding request RQ0 is actually issued to the memory controller 10 as the priority request PRQ. The permissible time information PT is information instructing the permissible time stored in correspondence to the respective initiators INI0 to INIn in a storage unit such as a register (not shown).

The permissible time counter PC0 counts down the count value CT0 in synchronization with the clock CLK. In this case, when the request actual issuing information ORQ0 becomes active, the permissible time instructed in the permissible time information PT0 is added to the count value CT0.

Similar to the permissible time counter PC0, the permissible time counters PC1 to PCn also receive the clock CLK along with the corresponding request actual issuing information ORQ and the permissible time information PT, and outputs the count values CT1 to CTn.

Thus, the count values CT0 to CTn counted in the permissible time counter PC0 to PCn refer to the remaining time of the permissible time of the initiators INI0 to INIn. Therefore, it is desirable that the request RQi of the initiator INIi having a small count value CTi (i=1 to n) is preferentially processed when the permissible time is taken into consideration.

The count value determining portion 25 receives the count values CT0 to CTn, compares the count values CT0 to CTn and the count threshold value LVth, and when the count value CT below the count threshold value LVth exists, outputs the priority initiator information PIJ2 instructing the memory access requiring initiator which is the initiator corresponding to the relevant count value CT.

The count value determining portion 25 outputs the priority initiator information PIJ2 instructing no memory access requiring initiator when the count value CT below the count threshold value LVth does not exist.

Returning again to FIG. 3, the selector 24 further receives the priority initiator information PIJ2, where if the memory access requiring initiator instructed by the priority initiator information PIJ2 exists, selects the request RQ of the memory access requiring initiator instructed by the priority initiator information PIJ2 as the priority request PRQ at top priority irrespective of the instruction content of the priority initiator information PIJ1.

Therefore, the page hit/miss determining unit 2 with permissible time determining function of the bus arbiter 1 of the first embodiment includes the page hit/miss determining part 21 and the permissible time determining part 22 that operate in conjunction with each other.

The page hit/miss determining part 21 preferentially determines the priority request PRQ2 from the page hit requests of the requests RQ0 to RQn. The permissible time determining part 22 can determine the request of the memory access requiring initiator which count value CTi which is the remaining time of the permissible time of the initiator INi has reached lower than or equal to the count threshold value LVth as the priority request PRQ2 in preference to the determination of the page hit/miss determining part (instruction content of the priority initiator information PIJ1).

Therefore, the bus arbiter 1 of the first embodiment can perform request arbitration preferentially taking into consideration the permissible times of the respective initiators INI0 to INIn while obtaining the effect of enhancing the issuing efficiency of the command (priority request) on the SDRAM by prioritizing the page hit request.

If the page hit request exists in plurals, the comparison circuit 23 in the page hit/miss determining part 21 of the bus arbiter 1 of the first embodiment outputs to the selector 24 the priority initiator information PIJ1 instructing the initiator with smaller remaining time of the permissible time based on the count values CT0 to CTn in the initiators corresponding to the page hit requests. That is, a page hit priority processing function for preferentially determining the request of smaller remaining time of the permissible time as the priority request PRQ2 when the page hit request exists in plurals is realized by the comparison circuit 23 and the selector 24 of the page hit/miss determining part 21.

Therefore, the request arbitration which takes into consideration the permissible times of the initiators INI0 to INIn can be performed even during the page hit priority processing executed when the priority initiator information PIJ2 does not instruct the memory access requiring initiator.

Figure 5:
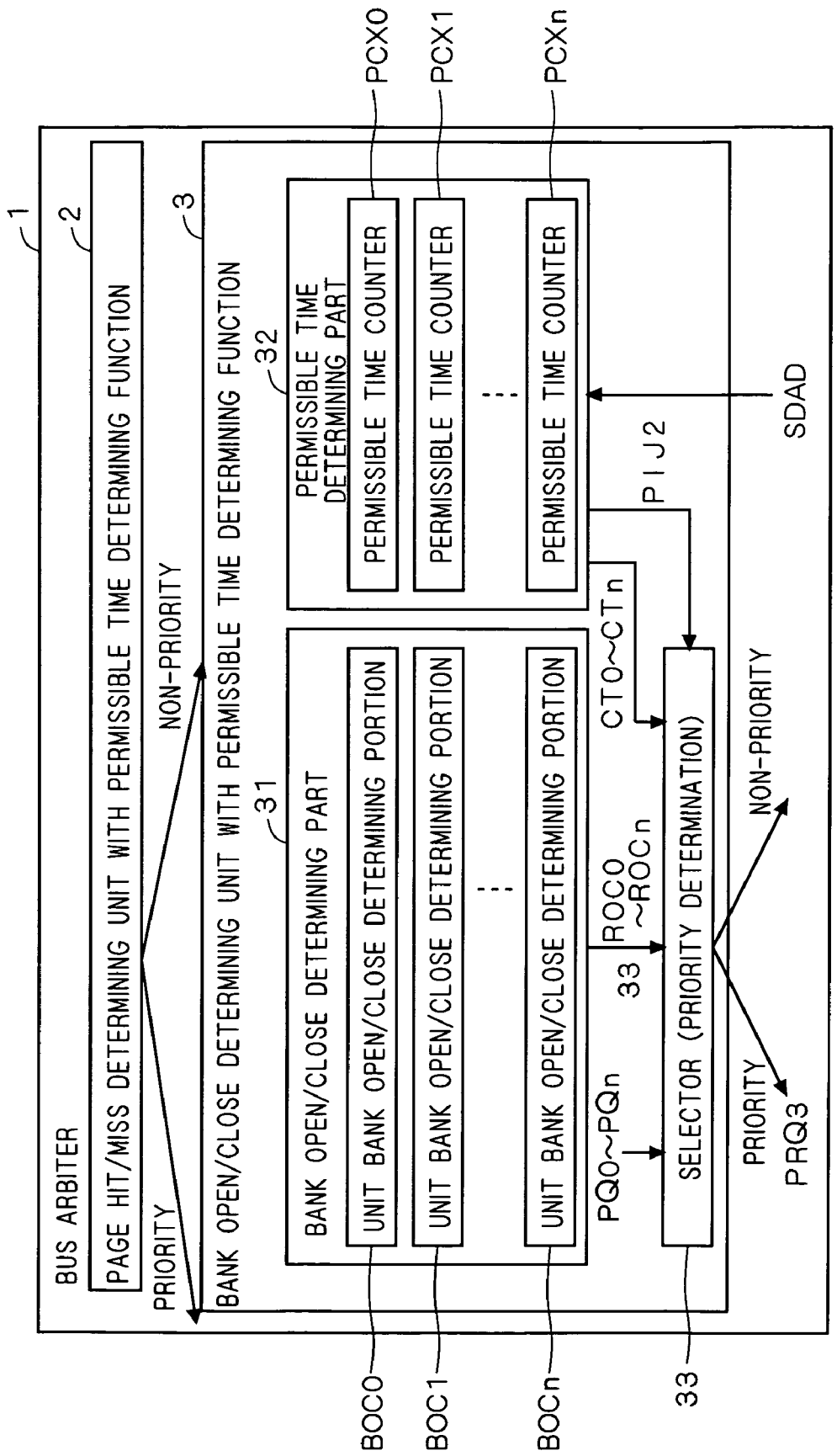
FIG. 5 is a block diagram showing an internal configuration of a bank open/close determining unit with permissible time determining function in the bus arbiter of the first embodiment.

FIG. 5 is a block diagram showing an internal configuration of the bank open/close determining unit 3 with permissible time determining function in the bus arbiter 1. As shown in the figure, the bank open/close determining unit 3 with permissible time determining function includes a bank open/close determining part 31 and a permissible time determining part 32. The bank open/close determining unit 3 with permissible time determining function is activated when the request of page hit by the page hit/miss determining unit 2 with permissible time determining function does not exist.

The bank open/close determining part 31 includes bank open/close determining portions BOC0 to BOCn in correspondence to the initiators INI0 to INIn. The bank open/close determining portions BOC0 to BOCn perform open/close determination on whether or not the banks to be accessed by the requests RQ0 to RQn are currently opened.

Figure 6:
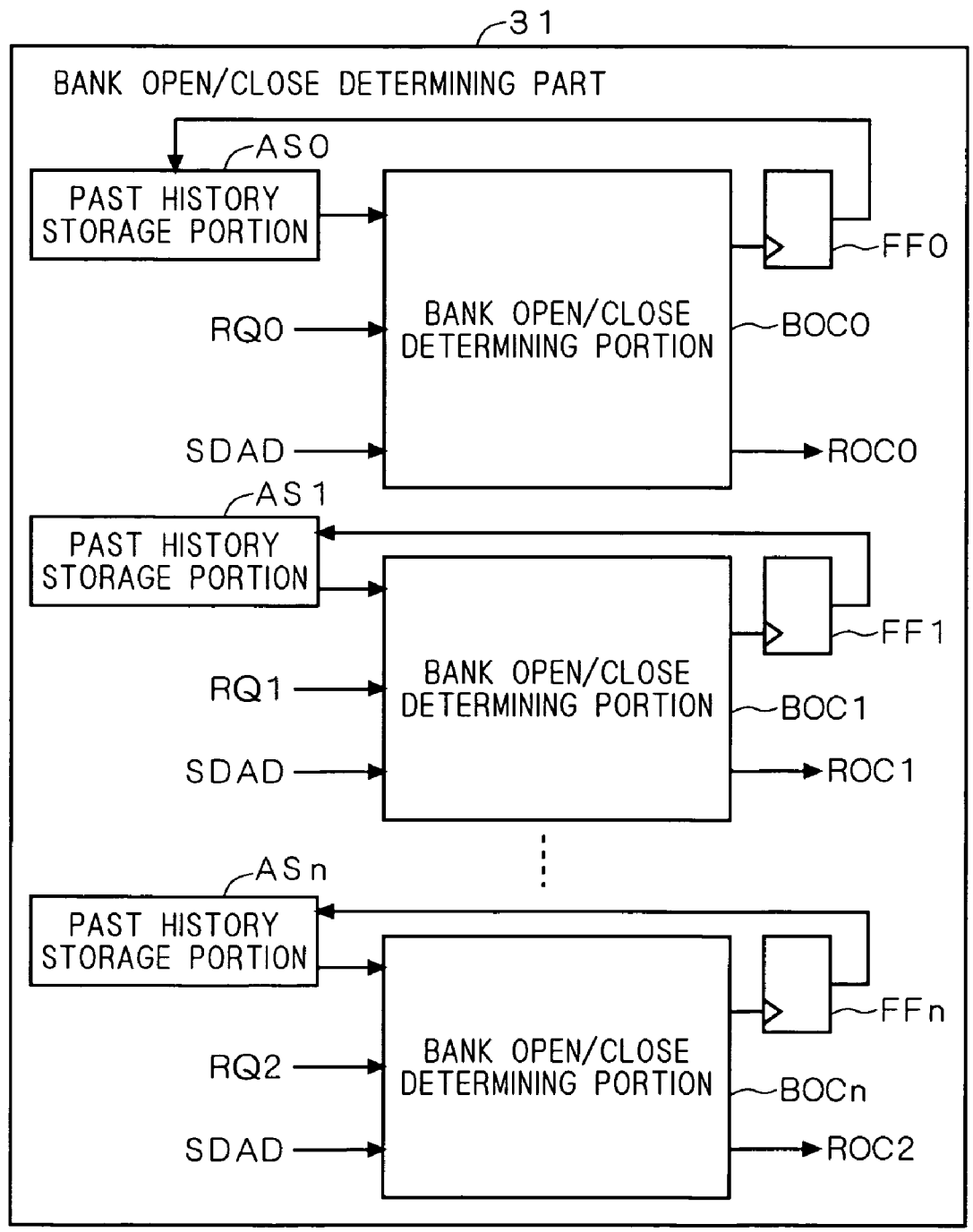
FIG. 6 is an explanatory view showing details of an internal configuration of a bank open/close determining part shown in FIG. 5.

FIG. 6 is an explanatory view showing details of an internal configuration of the bank open/close determining part 31. As shown in the figure, the bank open/close determining portions BOC0 to BOCn receive the respective requests RQ0 to RQn, and receive a common SDRAM address SDAD. The SDRAM address SDAD is an address of when the SDRAM is accessed. The SDRAM address SDAD retrieved to the bank open/close determining portions BOC0 to BOCn is stored for a predetermined amount as past history information in past history storage portions AS0 to ASn through flip-flops FF0 to FFn. That is, the history of the past SDRAM address SDAD is stored in the respective past history storage portion AS0 to ASn as the past history information.

The bank open/close determining portion BOCi (i=0 to n) references the request RQi and the past history information of the past history storage portion ASi, determines whether the access bank to the SDRAM instructed by the request RQi is in the open state or the closed state, and outputs an open/close determination result ROCi.

The configuration and the operation of the permissible time determining part 32 are the same as the permissible time determining part 22 in the page hit/miss determining unit 2 with permissible time determining function, and thus the description will be omitted. Permissible time counters PCX0 to PCXn of the permissible time determining part 32 correspond to the permissible time counters PC0 to PCn, and count values CT0 to CTn of the permissible time counters PCX0 to PCXn and the priority initiator information PIJ2 are output to a selector 33. The content of the count values CT0 to CTn and the priority initiator information PIJ2 are similar to those of the permissible time determining part 22.

The selector 33 receives the count values CT0 to CTn and the priority initiator information PIJ2 obtained from the permissible time determining part 32 along with the open/close determination result ROC0 to ROCn.

If the priority initiator information PIJ2 does not instruct memory access requiring initiator, the selector 33 extracts the request having the smallest count value CT of the requests RQ instructing a bank open state from the requests RQ0 to RQn based on the open/close determination result ROC0 to ROCn and the count values CT0 to CTn, and selects the same as a priority request PRQ3.

If the priority initiator information PIJ2 instructs memory access requiring initiator, the selector 33 preferentially selects the request RQ instructed by the priority initiator information PIJ2 of the requests RQ0 to RQn as the priority request PRQ3.

Therefore, the bank open/close determining unit 3 with permissible time determining function in the bus arbiter 1 of the first embodiment includes the bank open/close determining part 31 and the permissible time determining part 32 operating in conjunction with each other.

The bank open/close determining part 31 outputs the information determining the presence of bank open for each request as open/close determination results ROC0 to ROCn. The permissible time determining part 22 provides the priority initiator information PIJ2 instructing the memory access requiring initiator to the selector 33.

If the priority initiator information PIJ2 instructs the memory access requiring initiator, the selector 33 preferentially determines the request of the memory access requiring initiator instructed by the priority initiator information PIJ2 as the priority request PRQ3 in preference to the determination of the bank open/close determining part 31 (open/close determination result ROCi).

If the priority initiator information PIJ2 does not instruct the memory access requiring initiator, the selector 33 determines the priority request PRQ3 based on the determination of the bank open/close determining part 31 (open/close determination result ROCi).

Therefore, the request arbitration which preferentially takes into consideration the respective permissible times of the initiators INI0 to INIn can be performed while enhancing the command issuing efficiency on the SDRAM by taking into view the open/close state of the bank in the SDRAM.

If the request determined as bank open exists in plurals, the selector 33 of the bus arbiter 1 of the first embodiment preferentially determines the request of the initiator with smaller remaining time of the permissible time based on the count values CT0 to CTn as the priority request PRQ3. That is, the bank open/close determining unit 3 with permissible time determining function has a bank open priority processing function of preferentially determining the request of smaller remaining time of the permissible time as the priority request PRQ3 when the request determined as bank open exists in plurals by the bank open/close determining part 31 and the selector 33.

Therefore, the request arbitration that preferentially takes into consideration the permissible times of the plurality of initiators can be performed even during the bank open priority processing executed when the priority initiator information PIJ2 does not instruct the memory access requiring initiator.

Figure 7:
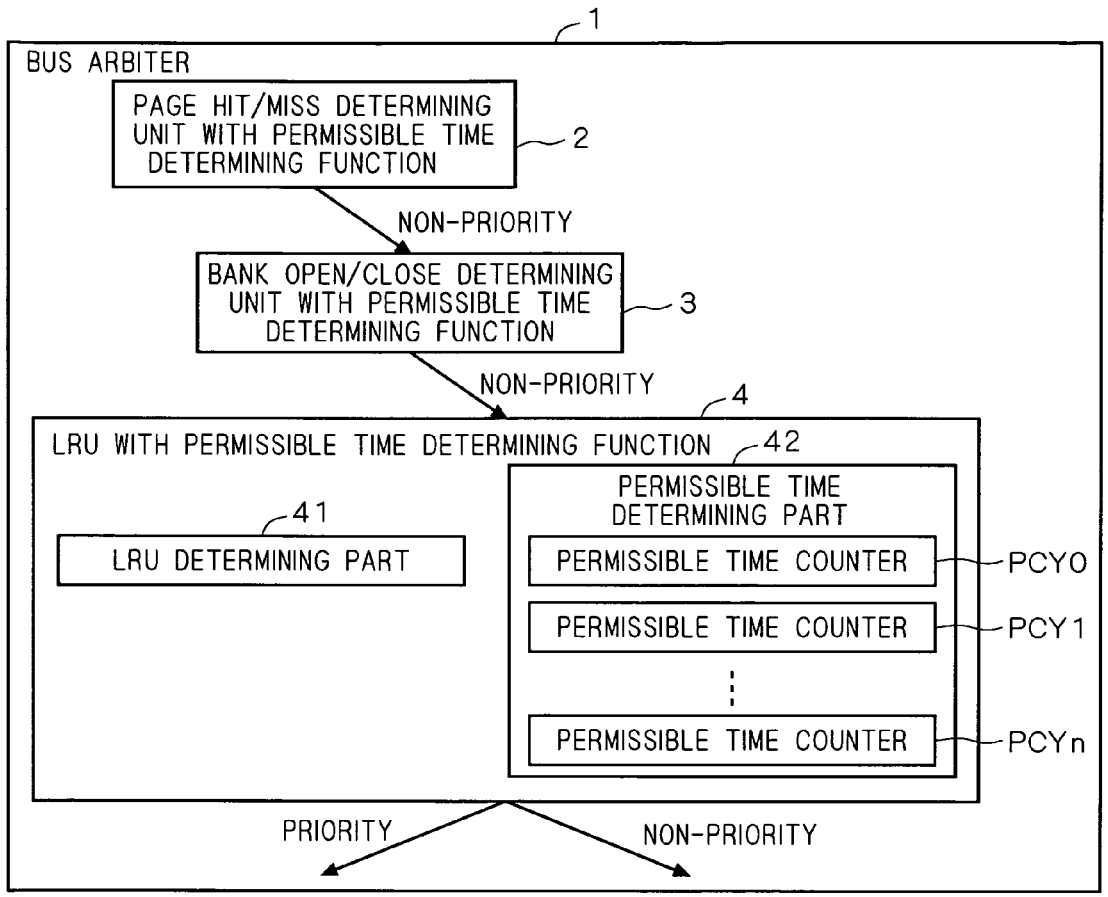
FIG. 7 is a block diagram showing an internal configuration of an LRU unit with permissible time determining function in the bus arbiter according to the first embodiment.

FIG. 7 is a block diagram showing an internal configuration of the LRU unit 4 with permissible time determining function. As shown in the figure, the LRU unit 4 with permissible time determining function includes an LRU determining part 41 and a permissible time determining part 42. The LRU unit 4 with permissible time determining function is activated when a request determined as bank open by the bank open/close determining unit 3 with permissible time determining function does not exist.

Figure 8:
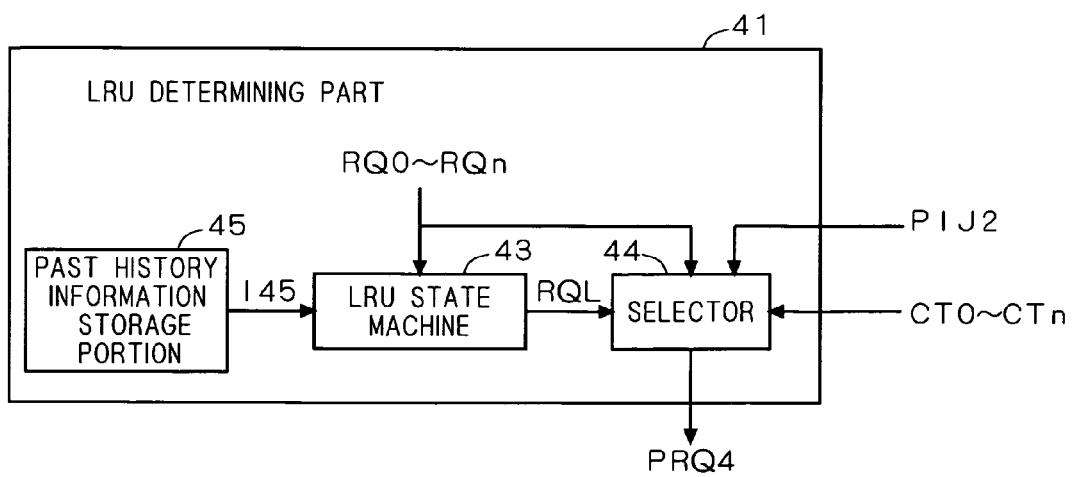
FIG. 8 is an explanatory view showing details of the internal configuration of the LRU determining part shown in FIG. 7.

FIG. 8 is an explanatory view showing details of the internal configuration of the LRU determining unit 41. In the figure, a past history information storage portion 45 stores bank access history information on the SDRAM based on the past SDRAM address SDAD. An LRU state machine 43 receives requests RQ0 to RQn and bank access history information 145 from the past history information storage portion 45. The LRU state machine 43 then recognizes the LRU bank which most recent access time is the least recent, that is, the LRU bank accessed the least recent by the bank access history information 145, and outputs the information instructing request RQ for bank accessing the relevant LRU bank to a selector 44 as LRU request information RQL.

The configuration and the operation of the permissible time determining part 42 are the same as the permissible time determining part 22 of the page hit/miss determining unit 2 with permissible time determining function, and thus the description thereof will be omitted. Permissible time counters PCY0 to PCYn of the permissible time determining part 42 correspond to the permissible time counters PC0 to PCn, and the count values CT0 to CTn of the permissible time counters PCY0 to PCYn and the priority initiator information PIJ2 are output to the selector 44. The content of the count values CT0 to CTn and the priority initiator information PIJ2 are the same as in the permissible time determining part 22.

The selector 44 receives the count values CT0 to CTn and the priority initiator information PIJ2 obtained from the permissible time determining part 42 along with the requests RQ0 to RQn and the LRU request information RQL.

If the priority initiator information PIJ2 does not instruct a priority initiator, the selector 44 extracts the request RQ having the smallest count value CT from the requests RQ0 to RQn out of the requests accessing the LRU bank based on the LRU request information RQL, and selects the same as priority request PRQ4.

If the priority initiator information PIJ2 instructs a priority initiator, the selector 44 selects the request RQ instructed by the priority initiator information PIJ2 from the requests RQ0 to RQn at top priority as the priority request PRQ4 irrespective of the content of the LRU request information RQL.

If the priority initiator information PIJ2 does not instruct a priority initiator, and the request to access the LRU bank does not exist, the selector 44 simply extracts the request RQ having the smallest count value CT0 to CTn from the requests RQ0 to RQn, and selects the same as the priority request PRQ4 (simple permissible time lowering priority processing).

Therefore, the LRU unit 4 with permissible time determining function in the bus arbiter 1 according to the first embodiment includes the LRU determining part 41 and the permissible time determining part 42 operating in conjunction with each other.

The LRU determining part 41 outputs the LRU request information RQL instructing the request having the LRU bank which recent access time is the least recent as the access bank. The permissible time determining part 42 outputs the priority initiator information PIJ2 for instructing memory access requiring initiator. If the priority initiator information PIJ2 instructs the memory access requiring initiator, the selector 44 in the LRU determining part 41 outputs the request of the memory access requiring initiator as the priority request PRQ4 in preference to the determination of the LRU determining part 41 (instructing content of the LRU request information RQL).

If the priority initiator information PIJ2 does not instruct the memory access requiring initiator, the selector 44 preferentially selects the request to access the LRU bank according to the determination of the LRU determining part 41 (LRU request information RQL), and outputs the same as the priority request PRQ4.

Therefore, the LRU unit 4 with permissible time determining function of the bus arbiter 1 of the first embodiment opens and accesses the LRU bank of the SDRAM to perform request arbitration that preferentially takes into consideration the respective permissible times of the initiators INI0 to INIn while enhancing the command issuing efficiency on the SDRAM.

If the LRU request information RQL instructs a plurality of LRU banks, the selector 44 in the LRU determining part 41 of the LRU unit 4 with permissible time determining function of the bus arbiter 1 preferentially determines the request with smaller remaining time of the permissible time based on the count values CT0 to CTn as the priority request PRQ4. That is, the LRU determining part 41 has an LRU bank priority processing function of preferentially determining the request with smaller remaining time of the permissible time as the priority request PRQ 4 when the request for bank accessing the LRU bank exist in plurals by the LRU state machine 43 and the selector 44.

Therefore, the bus arbiter 1 of the first embodiment performs request arbitration that takes into consideration the permissible times of the plurality of initiators even in the LRU bank priority processing according to the LRU bank priority processing function which takes the count values CT0 to CTn into consideration.

Figure 9:
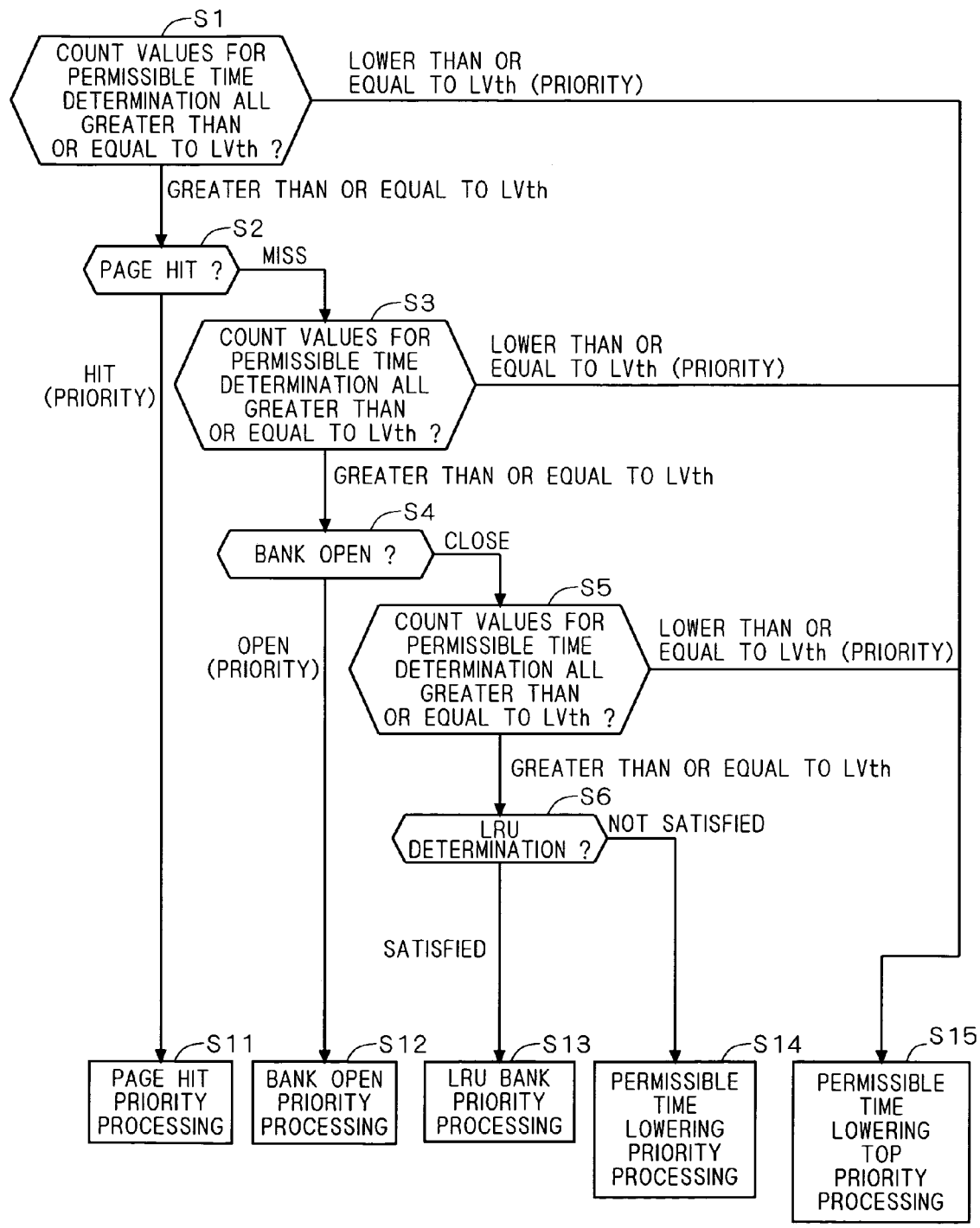
FIG. 9 is a flowchart showing a processing procedure of a bus arbitration method of the bus arbiter according to the first embodiment.

FIG. 9 is a flowchart showing a processing procedure of a bus arbitration method of the bus arbiter 1 of the first embodiment shown in FIGS. 1 to 8. The processing procedure of the bus arbitration method by the bus arbiter 1 of the first embodiment will be described with reference to the drawings.

In step S1, whether or not the count values CT0 to CTn for permissible time determination are all greater than or equal to the count threshold value LVth is determined by the page hit/miss determining unit 2 with permissible time determining function.

If determined that all the count values CT0 to CTn are greater than or equal to the count threshold value LVth in step S1, the process proceeds to step S2, and if determined that at least one of the count values CT0 to CTn is lower than or equal to the count threshold value LVth, the permissible time lowering top priority processing of step S15 is performed.

The process from step S1 to step S15 corresponds to a process of extracting the request RQ of the initiator instructed by the priority initiator information PIJ2 from the requests RQ0 to RQn and selecting the same as the priority request PRQ2 by the selector 24 of the page hit/miss determining part 21 when the priority initiator information PIJ2 instructing a priority initiator is output from the permissible time determining part 22 shown in FIG. 4.

In step S2, the presence of page hit is determined for all the requests RQ0 to RQn. That is, if determined as page hit in at least one request RQ of the requests RQ0 to RQn, the page hit priority processing of step S11 is performed, and if determined that all the requests RQ0 to RQn are page miss, the process proceeds to step S3.

The process from step S2 to step S11 corresponds to a page hit priority processing of selecting the request as the priority request PRQ2 based on the priority initiator information PIJ1 and the count values CT0 to CTn by the selector 24 in the page hit/miss determining part 21 shown in FIG. 3.

In step S3, whether or not the count values CT0 to CTn for permissible time determination are all greater than or equal to the count threshold value LVth is determined by the bank open/close determining unit 3 with permissible time determining function.

If determined that all the count values CT0 to CTn are greater than or equal to the count threshold value LVth in step S3, the process proceeds to step S4, and if determined that at least one count value CTi is lower than or equal to the count threshold value LVth, the permissible time lowering top priority processing of step S15 is performed.

The process from step S3 to step S15 corresponds to a process of extracting the request RQ of the initiator instructed by the priority initiator information PIJ2 from the requests RQ0 to RQn and selecting the same as the priority request PRQ3 by the selector 33 when the priority initiator information PIJ2 instructing a priority initiator is output from the permissible time determining part 32 shown in FIG. 5.

In step S4, the presence of bank open is determined for all the requests RQ0 to RQn, where if determined that the bank to be accessed is in the open state in at least one request RQ of the requests RQ0 to RQn, the bank open priority processing of step S12 is performed, and if determined that the bank to be accessed is closed in all the requests RQ0 to RQn, the process proceeds to step S5.

The process from step S4 to step S12 corresponds to a bank open priority processing of selecting the priority request PRQ3 from the requests RQ0 to RQn based on the open/close determination results ROC0 to ROCn and the count values CT0 to CTn by the selector 33 in the bank open/close determining part 31 shown in FIGS. 5 and 6.

In step S5, whether or not the count values CT0 to CTn for permissible time determination are all greater than or equal to the count threshold value LVth is determined by the LRU unit 4 with permissible time determining function.

If determined that all the count values CT0 to CTn are greater than or equal to the count threshold value LVth in step S5, the process proceeds to step S6, and if determined that at least one count value is lower than or equal to the count threshold value LVth, the permissible time lowering top priority processing of step S15 is performed.

The process from step S5 to step S15 corresponds to a process of extracting the request RQ of the initiator instructed by the priority initiator information PIJ2 from the requests RQ0 to RQn and selecting the same as the priority request PRQ4 by the selector 44 when the priority initiator information PIJ2 instructing a priority initiator is output from the permissible time determining part 42 shown in FIG. 7.

In step S6, the LRU determination is performed. In other words, whether or not at least one request RQ of the requests RQ0 to RQn is the request to access the least used bank (bank which recent access time is the least recent) is determined. If determined that the LRU determination is satisfied (bank is LRU bank), the LRU bank priority processing of step S13 is performed, and if determined that the LRU determination is not satisfied in all the requests RQ0 to RQn, a simple permissible time lowering priority processing of step S14 is executed.

The process from step S6 to step S13 corresponds to a process of extracting the request RQ with the smallest count value CT from the requests RQ0 to RQn out of the requests for accessing the LRU bank and selecting the same as the priority request PRQ4 based on the LRU request information RQL when the priority initiator information PIJ2 does not instruct a priority initiator by the selector 44 in the LRU determining part 41 shown in FIG. 8.

The process from step S6 to step S14 corresponds to a process of simply extracting the request RQ with the smallest count value CT0 to CTn from the requests RQ0 to RQn and selecting the same as the priority request PRQ4 when the priority initiator information PIJ2 does not instruct a priority initiator and request to access the LRU bank does not exist by the selector 44 of the LRU determining part 41 shown in FIG. 8.

Figure 17:
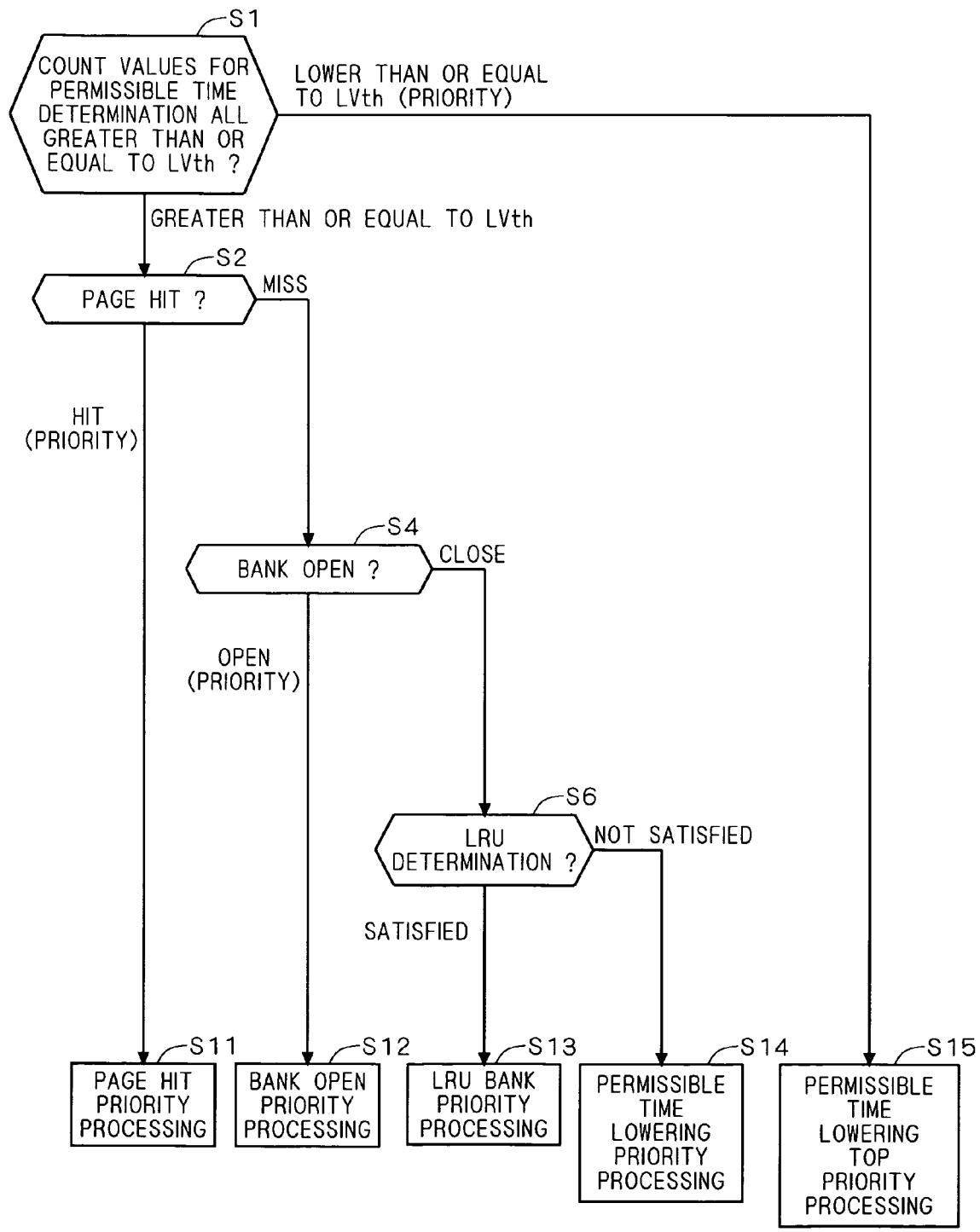
FIG. 17 is a flowchart showing a processing procedure of a bus arbitration method of another mode of the bus arbiter of the first embodiment.

FIG. 17 is a flowchart showing a processing procedure of the bus arbitration method of another mode of the bus arbiter of the first embodiment. As shown in the figure, the processes of step S3 and step S5 are omitted. Step S3 and step S5 are repetition of the process of the same content as step S1, and thus the process of step S3 and step S5 can be omitted as in the flow shown in FIG. 17. In other words, the flow is such that determination of step S4 is executed after determining as miss in step S2, and determination of step S6 is executed after determining as close in step S4.

Figure 18:
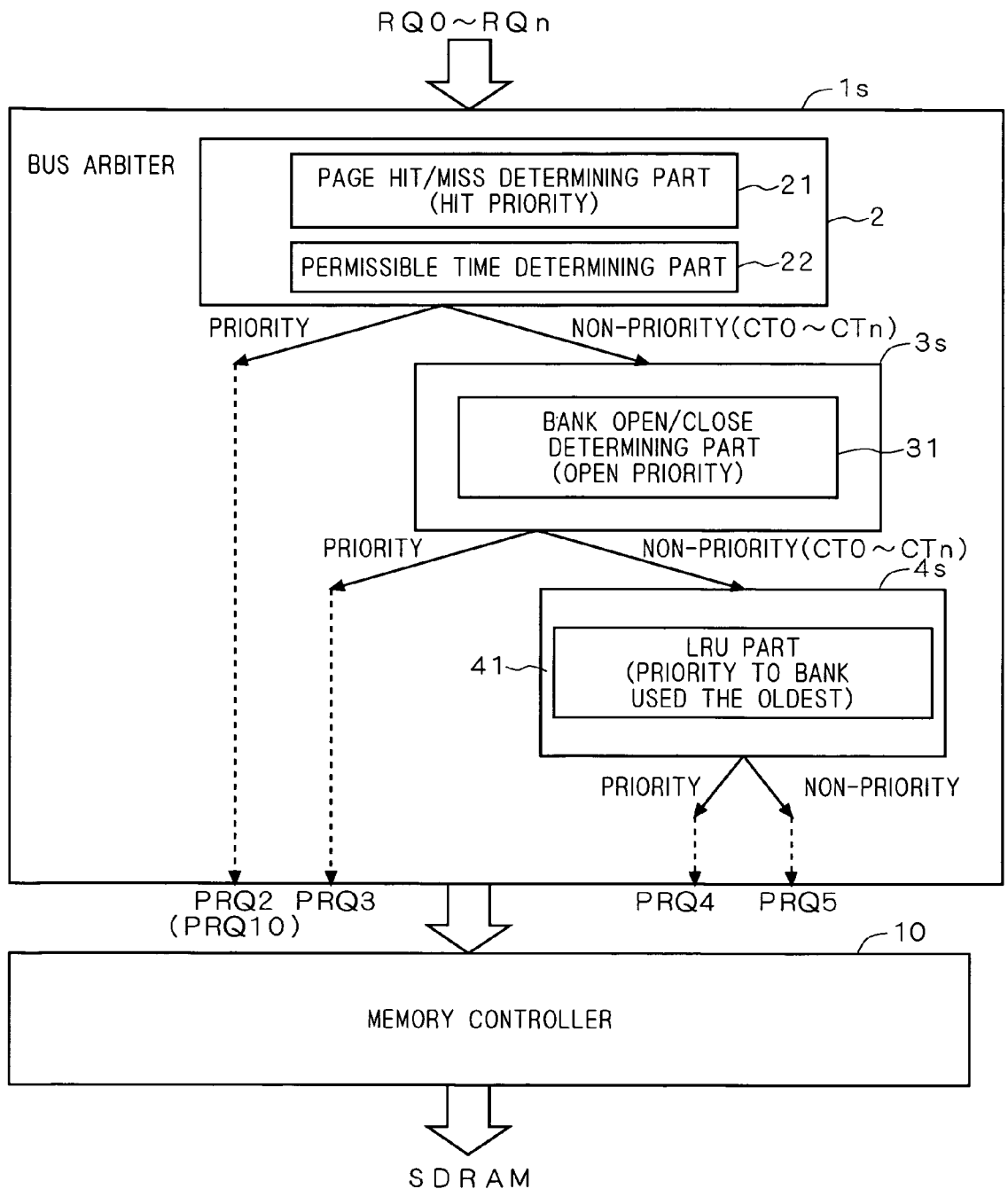
FIG. 18 is a block diagram showing a hardware configuration of a bus arbiter according to another mode of the first embodiment corresponding to the flow of FIG. 17.

FIG. 18 is a block diagram showing a hardware configuration of a bus arbiter 1s according to another mode of the first embodiment corresponding to the flow of FIG. 17. As shown in the figure, with respect to the bus arbiter 1 shown in FIG. 1, the bus arbiter 1s shown in FIG. 18 differs in that the bank open/close determining unit 3 with permissible time determining function is replaced with a simple bank open/close determining unit 3s and that the LRU unit 4 with permissible time determining function is replaced with a simple LRU unit 4s. The simple bank open/close determining unit 3s internally includes the bank open/close determining unit 31, and the component corresponding to the permissible time determining part 32 is omitted. Similarly, the simple LRU unit 4s internally includes the LRU determining part 41 and the component corresponding to the permissible time determining part 42 is omitted.

Furthermore, the bus arbiter 1s shown in FIG. 18 has a configuration of inputting the count values CT0 to CTn output from the permissible time counters PC0 to PCn of the permissible time determining part 22 to the simple bank open/close determining unit 3s and the simple LRU unit 4s. The simple LRU unit 4s is input with the count values CT0 to CTn through the simple bank open/close determining unit 3s.

That is, the count values CT0 to CTn obtained in the permissible time determining part 22 are utilized in the bank open/close determining part 31 and the LRU part 41. As a result, in the bus arbiter 1s shown in FIG. 18 as well, the bank open priority processing of step S12, the LRU bank priority processing of step S13, and the permissible time lowering priority processing of step S14 can be conducted without trouble.

Second Embodiment

Figure 10:
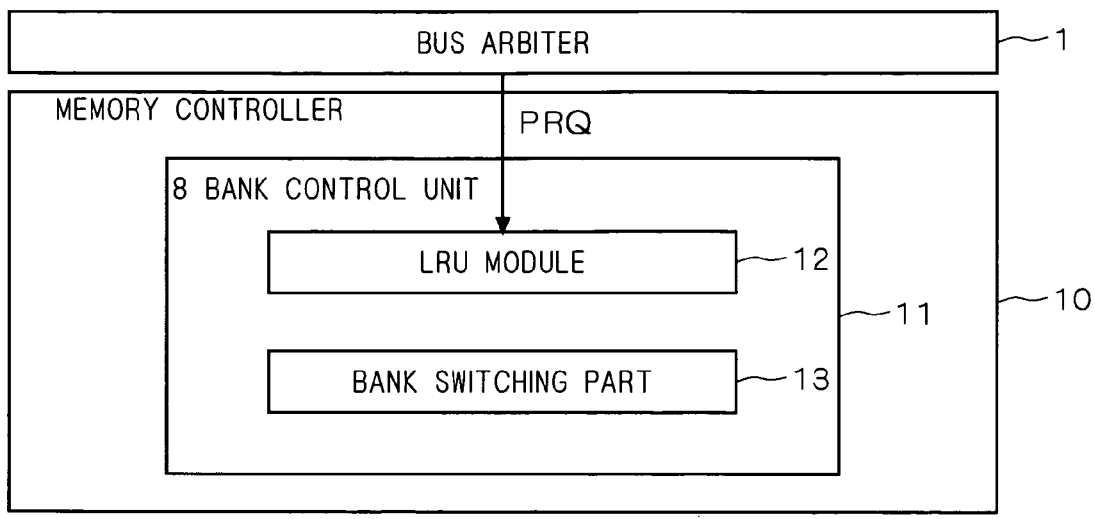
FIG. 10 is an explanatory view showing a configuration of a memory controller according to a second embodiment of the present invention.

FIG. 10 is an explanatory view showing a configuration of a memory controller 10 according to the second embodiment of the present invention. The memory controller 10 according to the second embodiment corresponds to the bus arbiter 1 of the first embodiment, and accesses the SDRAM to be controlled based on the priority request PRQ (one of PRQ2 to PRQ4) obtained by the bus arbiter 1.

The memory controller 10 assumes a case where the SDRAM to be controlled is an eight bank configuration. That is, the SDRAM to be controlled includes eight banks, four banks of which (predetermined number=4) can be opened.

As shown in FIG. 10, the memory controller 10 internally includes an eight bank control unit 11, and the eight bank control unit 11 includes an LRU module 12 and a bank switching part 13. The eight bank control unit 11 performs a bank close control for closing one of the predetermined number of banks in the open state when the priority request PRQ is a request to access a closed bank.

Figure 11:
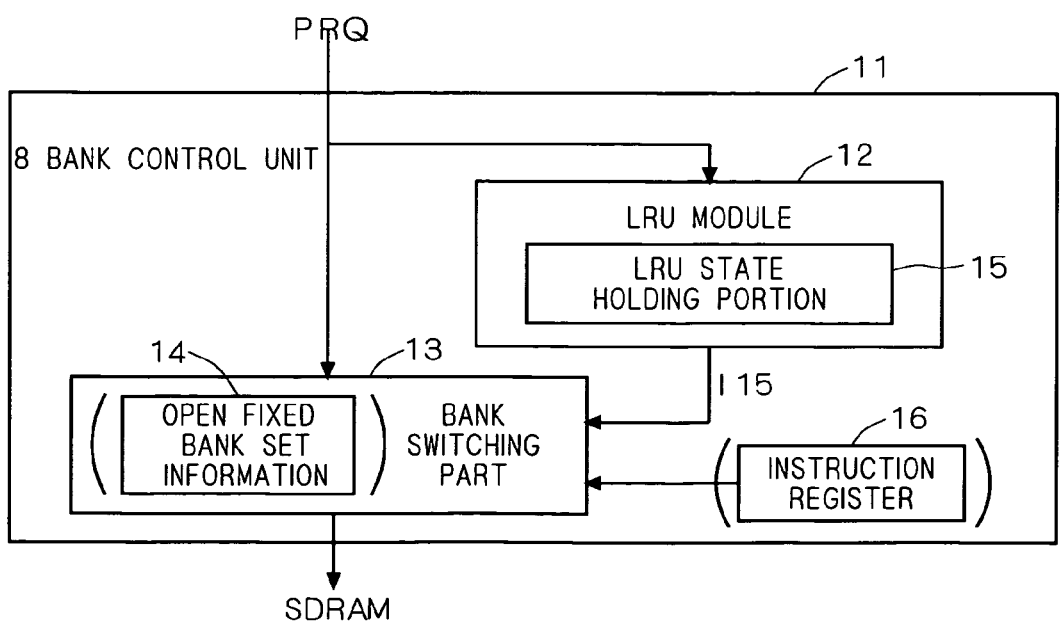
FIG. 11 is an explanatory view showing details of an eight bank control unit shown in FIG. 10.

FIG. 11 is an explanatory view showing the details of the eight bank control unit 11. As shown in the figure, the priority request PRQ is input to the LRU module 12 and the bank switching part 13.

The LRU module 12 stores LRU bank information I15 instructing the recent access time of each bank in the SDRAM to be controlled in an LRU state holding portion 15. The LRU module 12 outputs the LRU bank information I15 stored in the LRU state holding portion 15 to the bank switching part 13. The LRU module 12 constantly updates the recent access time of each bank in the SDRAM to be controlled based on the SDRAM address SDAD (not shown) issued from the memory controller 10 to the SDRAM, and holds the same as the LRU bank information I15 in the LRU state holding portion 15.

The bank switching part 13 performs a bank switching control on the SDRAM to be controlled of recognizing the LRU open bank which recent access time is the least recent of the currently opened banks from the LRU bank information I15, closing the LRU open bank, and opening the bank instructed by the priority request PRQ.

The memory controller 10 of the second embodiment enhances access to the SDRAM when closing one of the banks to open the fifth bank exceeding the open permissible number, and thus the LRU open bank is closed based on the LRU bank information I15. That is, the memory controller 10 determines the priority of the close bank of closing the banks in the order of least recent access time, and performs the bank switching control on the SDRAM.

Thus, the bank switching part 13 in the memory controller 10 of the second embodiment performs bank switching of preferentially closing the LRU open bank which recent access time is the least recent out of the four banks based on the LRU bank information I15 from the LRU state holding portion 15 when closing one of the four banks.

The LRU open bank is a bank which is assumed to be the least recently used, and thus the memory controller 10 of the second embodiment preferentially closes the LRU open bank so that the possibility of the frequently used bank being in the open state becomes high, whereby the performance of the SDRAM can be enhanced.

Compared to the SDRAM memory controller 55 shown in FIG. 14, a multi-control without a restriction that the open bank and the close bank form a pair by the bank groups BG0 to BG3 may be performed. As a result, the previous command process can be executed since the bank to be opened is not restricted, whereby the command that takes into consideration the transfer efficiency of the SDRAM can be issued to the SDRAM.

As a first variant of the second embodiment, a mode of taking into consideration the access from the initiator in advance, and determining the bank to be constantly opened is contrived. In this case, the bank switching part 13 performs a control on the constantly opened bank determined in advance so as to always be in the open state without closing.

Consequently, the access efficiency on the constantly opened bank recognized to be frequently used in advance enhances, and the access efficiency as a whole enhances.

A mode of hardware fixing the constantly opened bank is also contrived. For instance, as shown in FIG. 11, the bank switching part 13 includes an open fixed bank set information 14, where the bank specified by the open fixed bank set information 14 is controlled to be always opened. In this case, a constantly bank open control is performed of constantly opening the bank instructed by the open fixed bank set information 14, while close controlling the LRU open bank in the other open banks.

Thus, in the first variant of the second embodiment, the bank switching part 13 executes the constantly bank open control of having one part of the four banks as the open fixed bank and in the constantly opened state according to the open fixed set information 14. Therefore, the bank miss penalty is reduced and the issuing efficiency of the request on a predetermined memory is enhanced by setting the bank to be constantly opened as the frequently used bank.

As a second variant of the second embodiment, an instruction register 16 for instructing whether or not to set the constantly open bank may be arranged in the bank control unit 11, and the presence of adopting the open bank fixation may be determined based on the instruction content in the instruction register 16. That is, the bank switching part 13 can switch between performing all LRU control of close controlling the LRU bank for all the banks and performing the constantly bank open control based on the instruction content of the instruction register 16.

Accordingly, in the second variant of the second embodiment, the bank switching part 13 has a function of switching between whether or not to perform the constantly open control based on the instruction content of the instruction register 16, so that the use of constantly open control can be determined according to the state.

<Others>

The bus arbiter 1 of the first embodiment and the memory controller 10 of the second embodiment are applicable to all the systems using the SDRAM, and in particular, are effective when the requests from the plurality of initiators overlap with respect to the SDRAM.

While the invention has been shown and described in detail, the foregoing description is in all aspects illustrative and not restrictive. It is therefore understood that numerous modifications and variations can be devised without departing from the scope of the invention.

What is claimed is:

1. A request arbitration device for determining a priority request to be preferentially processed from a plurality of requests, which are access requests on a predetermined memory, obtained from a plurality of initiators, said predetermined memory being assigned with a plurality of banks, and said plurality of banks being assigned with a plurality of pages; the request arbitration device comprising:

a page hit/miss determining unit with permissible time determining function, wherein said page hit/miss determining unit with permissible time determining function includes, a page hit/miss determining part including a previous access address information holding portion for holding a previous access address, which is an access address to said predetermined memory, in said priority request determined immediately before, said page hit/miss determining part comparing the access addresses to said predetermined memory of said plurality of requests and said previous access address, determining presence of page hit in which a bank and a page specified by the respective addresses match for said plurality of requests, and preferentially determining said priority request from the page hit requests out of said plurality of requests, and a page hit/miss determination permissible time determining part, which operates in conjunction with said page hit/miss determining part, for counting a remaining time of each of a plurality of permissible times set in correspondence to said plurality of initiators which is an access waiting time on said predetermined memory, and when a memory access requiring initiator which is an initiator which the corresponding remaining time of said permissible time reached lower than or equal to a predetermined time exists in said plurality of initiators, determining a request of said memory access requiring initiator out of said plurality of requests as said priority request in preference to the determination of said page hit/miss determining part.

2. The request arbitration device according to claim 1, further comprising:

a bank open/close determining unit with permissible time determining function; wherein said bank open/close determining unit with permissible time determining function includes, a bank open/close determining part, which is activated when the request of page hit by said page hit/miss determining unit does not exist, for determining an open/close state of an access bank to said predetermined memory of each of said plurality of requests based on a history of past access address on said predetermined memory, and preferentially determining said priority request from requests determined as bank open of said plurality of requests, and a bank open/close determination permissible time determining part, which operates in conjunction with the bank open/close determining part, for counting the remaining time of each of said plurality of permissible times corresponding to said plurality of initiators, and when the memory access requiring initiator exists in said plurality of initiators, determining a request of said memory access requiring initiator in said plurality of requests as said priority request in preference to the determination of said bank open/close determining part.

3. The request arbitration device according to claim 2, further comprising;

an LRU unit with permissible time determining function; wherein the LRU unit with permissible time determining function includes, an LRU determining part, which is activated when the request determined as bank open by said bank open/close determining unit does not exist, for determining whether or not an access bank to said predetermined memory of each of said plurality of requests is an LRU bank which recent access time is the least recent based on a history of past access address on said predetermined memory, and preferentially determining said priority request from requests having said LRU bank as the access bank of said plurality of requests, and an LRU determination permissible time determining part, which operates in conjunction with said LRU determining part, for counting the remaining time of each of said plurality of permissible times corresponding to said plurality of initiators, and when the memory access requiring initiator exists in said plurality of initiators, preferentially determining a request of said memory access requiring initiator in said plurality of requests as said priority request in preference to the determination of said LRU determining part.

4. The request arbitration device according to claim 1; wherein
said page hit/miss determining unit with permissible time determining function has a page hit priority processing function for preferentially determining the request of the initiator with smaller remaining time of said permissible time as said priority request when said page hit request exists in plurals.

5. The request arbitration device according to claim 2; wherein
said bank open/close determining unit with permissible time determining function has a bank open priority processing function of preferentially determining the request of the initiator with smaller remaining time of said permissible time as said priority request when said request determined as bank open exists in plurals.

6. The request arbitration device according to claim 3; wherein
said LRU unit with permissible time determining function has an LRU priority processing function of preferentially determining the request of the initiator with smaller remaining time of said permissible time as said priority request when the request to access said LRU bank exists in plurals.

7. A request arbitration device for determining a priority request to be preferentially processed from a plurality of requests on a memory in which a plurality of pages is assigned to a plurality of banks requested from a plurality of initiators; the request arbitration device comprising:
a previous access address information holding portion for holding a previous access address on said memory in said priority request:
a page hit/miss determining part for comparing access addresses to said memory of said plurality of requests and said previous access address, determining presence of page hit in which a bank and a page specified by the respective addresses match for said plurality of requests,
and preferentially determining said priority request from the page hit requests out of said plurality of requests, and
a page hit/miss determination permissible time determining part for counting a remaining time of each of a plurality of access permissible times on said memory set in correspondence to said plurality of initiators, and when a memory access requiring initiator which is an initiator which the corresponding remaining time of said access permissible times reached lower than or equal to a predetermined time exists in said plurality of initiators, determining a request of said memory access requiring initiator out of said plurality of requests as said priority request in preference to the determination of said page hit/miss determining part.

8. The request arbitration device according to claim 7, further comprising:
a bank open/close determining part for determining an open/close state of an access bank to said memory of each of said plurality of requests based on a history of access address on said memory when the request of page hit by said page hit/miss determining part does not exist, and preferentially determining said priority request from requests determined as bank open of said plurality of requests.

9. The request arbitration device according to claim 8, further comprising:
an LRU determining part for determining whether or not an access bank to said memory of each of said plurality of requests is an LRU bank which recent access time is the least recent based on a history of access address on said memory when the request determined as bank open by said bank open/close determining part does not exist, and preferentially determining said priority request from requests having said LRU bank as the access bank of said plurality of requests.

10. The request arbitration device according to claim 7, wherein
said page hit/miss determining part has a page hit priority processing function for preferentially determining the request of the initiator with smaller remaining time of said access permissible time as said priority request when said page hit request exists in plurals.

11. The request arbitration device according to claim 8; wherein
said bank open/close determining part has a bank open priority processing function of preferentially determining the request of the initiator with smaller remaining time of said access permissible time as said priority request when said request determined as bank open exists in plurals.

12. The request arbitration device according to claim 9; wherein
said LRU part has an LRU priority processing function of preferentially determining the request of the initiator with smaller remaining time of said access permissible time as said priority request when the request to access said LRU bank exists in plurals

* * * * *